Nov. 3, 1964     A. JAZBUTIS     3,154,864
VEHICLE SIMULATOR
Filed March 6, 1961
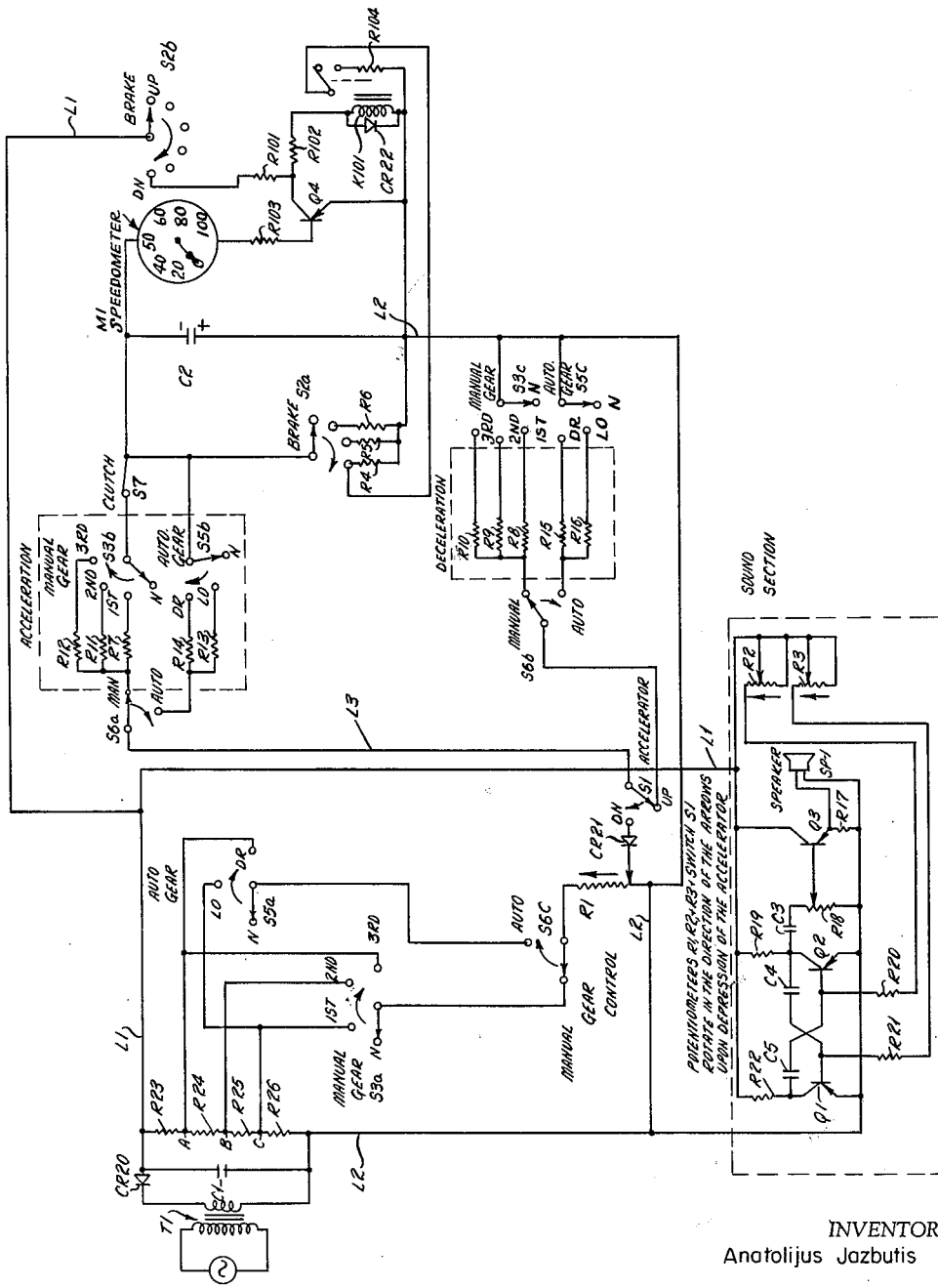
INVENTOR
Anatolijus Jazbutis
BY *Strauch, Nolan & Neale*
ATTORNEYS

United States Patent Office 3,154,864
Patented Nov. 3, 1964

3,154,864
VEHICLE SIMULATOR
Anatolijus Jazbutis, Jamestown, N.Y., assignor to Rockwell Manufacturing Company, Pittsburgh, Pa., a corporation of Pennsylvania
Filed Mar. 6, 1961, Ser. No. 93,538
13 Claims. (Cl. 35—11)

The present invention relates to automotive vehicle simulators and more particularly to improvements in electrical circuits for visually and audibly simulating variations in speed in automobile driver training and testing devices.

The basic object of this invention is to provide an improved device for electrically simulating the operation of a speedometer in response to manipulation by an operator of various simulated automobile control instrumentalities such as simulated accelerators, brakes and gear shifts and to audibly simulate variations in the sound of an automobile engine in response to actuation of a simulated accelerator.

A further object of this invention is to provide a simulated automobile speedometer responsive to operator manipulation of simulated automobile control instrumentalities which simulated speedometer is in the form of a voltmeter connected in parallel to a capacitor and in which the magnitude of charge upon and the rate of charge and discharge of the capacitor is controlled in accord with the manipulation of the simulated controlled instrumentalities so that the charge on said capacitor is maintained proportional to the simulated vehicle speed.

These and other objects of the present invention will become more fully apparent by reference to the appended claims and as the following detailed description proceeds in reference to the accompanying drawing wherein the single figure is a schematic wiring diagram of the simulator of the present invention.

Referring now to the drawing illustrating the present invention, the simulated speedometer M1 in the form of a voltmeter having a movable pointer cooperating with an indicator scale calibrated in miles per hour, is connected in parallel with a capacitor C2 (2000 microfarads) through resistor R103 (2.7K ohms) and the base-emitter circuit of a transistor Q4. By this arrangement, the voltmeter M1 will always have an indication proportional to the voltage across the capacitor, that, is to the charge upon a capacitor of a given magnitude.

Electrical power is supplied to the circuit from a suitable 110 volt A.C. through a step-down transformer T1 across the secondary winding of which is connected a filtering capacitor C1 (1000 microfarads) and a rectifier CR20. By this arrangement, the voltage appearing on line L1 is at —8.4 volts D.C. with respect to the line L2. A voltage divider network is connected between lines L1 and L2 in parallel with the capacitor C1. This voltage divider network comprises resistors R23 (120 ohms), R24 (150 ohms), R25 (120 ohms), and R26 (270 ohms) connected in series as shown. Line L2 is permanently connected to one side of the capacitor C2 and to the emitter of the transistor Q4.

As the apparatus shown in the drawing is adapted for used in a simulated automobile which may be used for training or testing an operator in the use of either a manual or an automatic transmission, selection between manual and automatic transmission operation is provided by a three-pole selector switch having three sections S6a, S6b, and S6c simultaneously operable between the indicated manual and automatic positions.

*Manual Transmission Simulation (Acceleration)*

Selector switch sections S6a, S6b, and S6c are shown in their manual positions. When in those positions, the switch sections S6a, S6b and S6c are connected in series with manual gear selector switch sections S3b, S3c and S3a respectively. The manual gear selector switch sections S3a, S3b and S3c each have neutral "N," first "1st," second "2nd" and third "3rd" positions as indicated on the drawing and are simultaneously shifted among these several positions by operator manipulation of a simulated manual gear shift selector lever or "stick" (not shown). The designations "N," "1st," "2nd," and "3rd" correspond respectively to the neutral, first, second and third gears of the conventional three speed manual transmission. If a four speed or other speed transmission is simulated, the number of selectable positions of switch sections 3a, 3b and 3c will, of course, be increased accordingly.

Considering first the manual gearing selector switch sections S3a, when switch section S3a is in its neutral position (N) there is no connection between the "manual" terminal of switch section S6c and the voltage divider network formed by resistors R23 through R26. When switch section S3a is in its "1st" position, the manual terminal of switch section S6c is connected to point "C" on the voltage divider network, that is, the junction between resistors R25 and R26; when switch section S3a is in its "2nd" position, the "manual" terminal of switch S6c is connected to terminal "B" of the voltage divider network, that is, the junction between resistors R24 and R25; and when the switch section S3a is in its "3rd" position, the "manual" terminal of switch section of S6c is connected to terminal "A" of the voltage divider network, that is, to the junction between resistor R23 and resistor R24. By this arrangement, as the manual gear shift lever is shifted from neutral into first, into second and then into third, the voltage appearing at the "manual" terminal of switch section S6c with respect to the line L2 is progressively increased from zero to a first negative value, a second negative value higher than the first and a third negative value higher than the second and first. These three values determine the maximum voltage which can be applied to capacitor C2 when the simulated manual transmission gear shift lever is in its first, second and third positions respectively. The different voltages provide the maximum speed obtainable in these gear positions.

With the switch section S6c in its "manual" position the voltage selected by the switch section S3a is applied across the potentiometer R1 (2.5K ohms). The movable arm of the potentiometer R1 is connected for actuation by depression of the simulated accelerator pedal. When no pressure is placed upon the simulated accelerator pedal, the movable arm is in its position as shown in the drawing in which it is connected to line L2. As the accelerator pedal is depressed, the movable arm of potentiometer R1 is moved upwardly in the direction indicated by the arrow and at full depression of the accelerator pedal, the full voltage appearing across potentiometer R1 is applied to the movable arm thereof in reference to the line L2. The movable arm of potentiometer R1 is connected through a diode CR21 to the fixed down terminal "DN" of switch S1. The movable arm of switch S1 is controlled by the accelerator pedal. So long as there is no pressure upon the accelerator pedal, the movable arm of switch S1 is in its "up" position as shown in the drawing. When pressure is applied and so long as pressure is applied to the accelerator pedal, the movable arm of switch S1 is moved to the position in which it engages the "DN" terminal thereof to interconnect the movable arm of potentiometer R1 through diode CR21 to the line L3. Line L3 is connected to the movable arm of switch section S6a.

By this arrangement, so long as no pressure is applied to the accelerator, the line L3 is disconnected from the voltage divider network formed by resistors R23 through R26. Upon depression of the accelerator pedal, line L3 is connected to the voltage divider network formed by resistors R23 through R26 and the voltage applied to line L3 is determined by the gear selection and by the degree of depression of the accelerator pedal through switch section S3a and potentiometer R1 respectively.

With the switch section S6a in its manual position "MAN" the voltage appearing on line L3 is applied to the common connection to resistors R7, R11 and R12 (39, 270 and 330 ohms respectively). The upper side of capacitor C2 is connected through a clutch control switch S7 to the movable arm of switch section S3b. Switch S7 is closed so long as the clutch pedal is up, that is, so long as the clutch is engaged. Switch section S3b, like switch section S3a has four positions for its movable arm: a neutral position "N" and "1st," "2nd" and "3rd" positions corresponding respectively to the normal three gear ratios which may be selected in a manual transmission. So long as switch section S3b is in its "N" position, there is no connection between the upper side of capacitor C2 and the line L3 through any of the resistors R7, R11 or R12; when switch section S3b is in its first position, a connection is made through R7; when in its second position, a connection is made through resistor R11; when in its third position, a connection is made through resistor R12. Since resistors R7, R11 and R12 are adapted for connection in series with the charging path for capacitor C2, the value of these resistors will determine the rate at which capacitor C2 charges to the maximum potential value as determined by the setting of the potentiometer R1 and the switch section S3a. When switch section S3b is in its first position, capacitor C2 will charge at its maximum rate since resistor R7 is of the lowest ohmic value of this set of resistors. When the switch section S3b is in its third position, capacitors C2 will charge at its slowest rate since resistor R12 is of the highest ohmic value of the resistors in this set. When the switch section S3b is in its second position, capacitor C2 will charge at an intermediate rate.

If, for example, first gear has been selected by the operator, and the accelerator pedal has been fully depressed, the capacitor C2 will charge ultimately to the voltage appearing on terminal C of the voltage divider network at a rate determined by the value of the resistor R7.

*Automatic Gear Shift (Acceleration)*

The operation during acceleration for automatic transmission simulation is similar to that described above. For automatic transmission simulation, the switch sections S6a, S6b and S6c are in their "AUTO" positions. The automatic gear selector switch has three sections S5a, S5b and S5c. In the illustrated embodiment, these switch sections have three positions; neutral "N," low "LO," and drive "DR" corresponding to the normal two speed automatic transmission. When the movable arm of the switch sections S5a, S5b and S5c are in their "N" positions, no circuit is completed through these switch sections. When switch section S5a is in its "LO" position, the "AUTO" terminal of switch section S6c is connected through switch section S5a to terminal C on the voltage divider. When switch section S5a is in its "DR" position, the "AUTO" position of switch section S6c is connected through switch section S5a to terminal A on the voltage divider.

When the switch section S6a is in its "AUTO" position, the line L3 is connected to the common connections to resistors R13 (39 ohms) and R14 (330 ohms). Resistors R13 and R14 are connected respectively to the "LO" and "DR" terminals of the switch section S5b, the movable arm of which is connected directly to the upper side of the capacitor C2. The clutch switch S6 is bypassed during automatic operation since there is no clutch in the normal automatic transmission. By this arrangement, during simulated automatic transmission operation, the rate of charge of capacitor C2 is determined by resistor R13 when the transmission is in "LO" and by resistor R14 when the transmission is in "DR."

*Manual Transmission (Deceleration)*

With a manual transmission, deceleration can occur in a vehicle merely by release of pressure upon the accelerator with the transmission in one of its driving positions, can occur by placing the transmission in "Neutral," can occur by application of the brake with the transmission engaged and by application of the brake without the transmission engaged. With the transmission engaged, the deceleration rate will vary with the gear ratio selected. For manual transmission simulation, the drive from the transmission can be disengaged either by placing the transmission in neutral or by disengaging the clutch.

The present invention simulates each of the foregoing conditions. Assuming that capacitor C2 has been charged to some value, with the transmission selector in neutral position as shown, the clutch engaged, or disengaged, and no pressure applied to the brake, the capacitor C2 will gradually discharge through the voltmeter M1, the resistor R103 and the base-emitter circuit of the transistor Q4. This is an extremely high resistance circuit. Discharge through this circuit will take a substantial length of time and simulate the slowest rate of deceleration.

Switch sections S2a and S2b are connected to and operated by the simulated brake pedal. They are illustrated in the positions they assume when no pressure is applied to the brake pedal. If, with the clutch disengaged or the transmission in neutral, the brake is applied to actuate control switch sections S2a and S2b following charging of the capacitor C2 to some predetermined value, the capacitor C2 will discharge through either resistor R4 (1K ohms), R5 (2.2K ohms) or R6 (5.6K ohms) depending upon the degree of depression of the brake. Slight depression of the brake connects the movable arm of switch section S2a to resistor R6; intermediate depression of the brake pedal connects the movable arm of switch section S2a to resistor R5; and full depression of the brake connects movable arm of switch section S2a to resistor R4. The values of resistors R4, R5 and R6 and the degree of depression of the brake pedal thus determine the rate of discharge of capacitor C2, slight depression of the brake providing the slowest rate of discharge of capacitor C2 and full application of the brake providing the most rapid discharge of capacitor C2 due to the lower ohmic value of resistor R4.

The voltage across the capacitor C2 due to deceleration will drop at a decreased rate—approaching zero value asymptotically. This represents a very slow deceleration of the car while it is at a low speed. This effect is particularly noticeable with hard application of the brake where the car is expected to stop very quickly from 10 miles per hour to zero speed. In order to overcome this erroneous simulation of the normal deceleration of a vehicle under these conditions by the normal discharge curve for a capacitor, transistor Q4 is inserted in the connection between the voltmeter M1 and the line L2, its emitter being connected to line L2 and its base being connected through resistor R103 to the voltmeter M1. The collector of the transistor Q4 is connected through resistor R101 (56 ohms) to the fixed terminal "DN" of switch section S2b of the brake control switch. When the brake is fully depressed, the movable arm of switch section of S2b will interconnect line L1 through resistor R101 to the collector of transistor Q4 and through resistor R101 and resistor R102 (220 ohms) to one terminal of the coil of relay K101. The opposite side of the coil of relay 101 is connected to line L2. A diode CR2 is connected in parallel with the coil of relay K101. By this arrangement, the transistor Q4 will, in effect, measure the simulated speed of the vehicle. When the voltage across capacitor C2 drops to a value simulating the speed approaching approximately 10 miles per hour during deceleration as the result of depression of the brake pedal, the transistor will stop conducting and thereby automatically energize the relay K101, which will close its normally open contacts to connect resistor R104 (220 ohms) in parallel with resistor R4 to line L2. The addition of this parallel connection through resistor R104, due to the low ohmic value of resistor R104, will produce rapid discharge of capacitor C2 upon full depression of the brake and thus provide the required simulated rapid deceleration of the vehicle under these conditions. Resistors R4, R5, R6 and R104 thus form a selectively variable resistance variable under control of the brake pedal depression. A single variable resistance can, of course, be substituted if desired.

Upon release of pressure on the accelerator pedal, the switch S1 is restored to its "Up" position in which the movable arm of switch section S6a is interconnected with the movable arm of switch section S6b. With a simulated manual transmission, so long as the manual transmission is in neutral or the clutch disengaged, there is no discharge path for capacitor C2 through line L3. With the clutch engaged so that switch S7 is closed, and the manual transmission in "1st," capacitor C2 can discharge through a path through switch S7 through switch section S3b, resistor R7, switch section S6a, switch S1, switch section S6b, resistor R8 (1.2K ohms), switch section S3c, to line L2.

If the manual gear shift is in "2nd," the discharge path is through resistors R11 and R9 (3.3K ohms) and if, in "3rd," through resistors R12 and R10 (10K ohms). By this arrangement, the slowest rate of deceleration, that is of discharge of capacitor C2, results when the transmission is in "3rd," the fastest rate of deceleration when the transmission is in "1st" and in intermediate rate of deceleration when the transmission is in "2nd."

As is apparent, if the brake is applied simultaneously with the release of the pressure upon the accelerator while the transmission is in "1st," "2nd" or "3rd" and the clutch is engaged, the capacitor C2 will discharge more rapidly through the parallel brake and accelerator controlled circuits thus provided than through either alternatively.

*Automatic Transmission (Deceleration)*

The operation of the brake circuit for simulated automatic transmission is the same as described above in reference to the manual transmission. For simulation of an automatic transmission, the switch sections S6a and S6b are in their "AUTO" positions. The switch sections S5b and S5c are operable to select either neutral "N," low "LO," or drive "DR." If the transmission is in "LO" a discharge path for capacitor C2 is provided through resistor R13, switch section S6a, switch S1, switch section S6b, resistor R16 (1.2K ohms) and switch section S5c. If the transmission is in drive "DR," the deceleration path is through resistor R14 and resistor R15 (10K ohms).

From the foregoing it is apparent that the circuit of this invention simulates the response of an automobile during its various operative conditions. The mass of the vehicle is simulated by the capacitance of the capacitor C2. The acceleration of the vehicle is simulated by the current flowing to or from the capacitor C2. The force available for acceleration of the vehicle is simulated by the maximum potential charging voltage as selected by the position of the switch section S3a or switch section S5a and the position of the potentiometer R1. The speed of the vehicle is simulated by the accumulated electrical charge on the capacitor C2 which is, of course, proportional to the voltage across the capacitor C2, as indicated by the voltmeter 1 calibrated in miles per hour to simulate the speedometer.

*Sound Simulator*

The sound simulator comprises a variable frequency oscillator formed by transistors Q1 and Q2, resistors R22 and R19 and capacitors C5 and C4. The emitters of transistors Q1 and Q2 are connected directly to line L2. The collectors of transistors Q1 and Q2 are connected through resistors R22 (1K ohms) and R19 (1K ohms) respectively to line L1. The base of transistor Q2 is connected to the collector of transistor Q1 through a 10 microfarad capacitor C5 and the base of transistor Q1 is connected to the collector of transistor Q2 through a 10 microfarad capacitor C4. The bases of transistors Q1 and Q2 are connected through resistors R21 and R22 respectively (each 1.5K ohms) to potentiometers R3 and R2 (each 5K ohms) respectively. The other terminal and movable arms of potentiometers R2 and R3 are connected in common to line L1. The movable arms of potentiometers R2 and R3 move in the directions indicated by the arrows upon depression of the accelerator and thereby increase the frequency of oscillation of the variable frequency oscillator.

The output of the oscillator is applied through a 50 microfarad capacitor C3 to a volume control potentiometer R18 (1K ohms) the movable arm of which is connected to the base of a transistor amplifier Q3. The collector of transistor Q3 is connected directly to line L1 and its emitter is connected through resistor R17 (2.2K ohms to line L2. The loud speaker SP1 is connected in parallel with the resistor R17 to produce an audible sound at a frequency determined by the setting of potentiometers R2 and R3 to thereby simulate the engine sound.

The specific values of the resistors, capacitors, etc. given herein are merely illustrative of one operative physical embodiment of the invention and may be varied while retaining the same ultimate results as is well known to those skilled in the art.

The invention therefore may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an automobile simulator having a simulated accelerator, a simulated brake, a simulated transmission shifting device and a simulated speedometer in the form of a voltmeter; a capacitor connected in parallel with said voltmeter; a charging circuit and a discharging circuit alternatively connectable to said capacitor; means controlled by said accelerator for controlling the alternative connection of said capacitor to said charging and discharging circuits; said charging circuit including a voltage source, means controlled by said shifting device and means controlled by said accelerator for determining the maximum potential charge of said capacitor from said source, and means controlled by said shifting device for controlling the rate of charge of said capacitor from said source; said discharging circuit including means controlled by said shifting device and means controlled by said brake for controlling the rate of discharge of said capacitor.

2. The combination defined in claim 1 wherein said shifting device has a neutral position and a series of forward speed positions and wherein said shifting device maximum potential charge determining device comprises a voltage divider connected across said source and a switching device positioned by said shifting device, said switching device being operative in the neutral position of said shifting device to disconnect said capacitor from said voltage divider and said source and to connect said capacitor across progressively higher voltage differential connections on said voltage divider for each progressive forward shift in said series of positions of said shifting device.

3. The combination defined in claim 1 wherein said shifting device simulates the shift of a manual gear shift transmission.

4. The combination defined in claim 1 wherein said shifting device simulates the shift of an automatic transmission.

5. The combination defined in claim 1 wherein said accelerator controlled maximum potential charge determining means comprises a potentiometer connected to said shifting device controlled maximum potential charge determining means and having a movable arm positioned by said simulated accelerator and connected to said alternate connection controlling means.

6. The combination defined in claim 1 wherein said shifting device has a neutral position and a series of forward speed positions wherein said rate of charge controlling means comprises a set of resistors of progressively increasing resistance, the number of resistors in said set being equal in number to the number of forward speeds of said shifting device, and a switching device controlled by said shifting device and operative in each of the forward speed positions of said shifting device to connect a resistor of said set in series between said alternative connection controlling means and one side of said capacitor and in the neutral position of said shifting device to disconnect said capacitor from said alternative connection controlling means.

7. The combination defined in claim 6 wherein said rate of discharge controlling means includes said rate of charge controlling means and a further and like controlled set of resistors selectively connectable under control of said shifting device between said alternative connection controlling means and the other side of said capacitor.

8. The combination defined in claim 1 wherein said shifting device has a neutral position, and a series of forward speed positions, wherein said rate of discharge controlling means comprises at least one set of resistors of progressively increasing resistance and equal in number to the number of forward speeds of said shifting device and a switching device controlled by said shifting device and operative in each of the forward speed positions of said shifting device to connect a resistor of said set in parallel with said capacitor and in the neutral position of said shifting device to disconnect said capacitor from all of the resistors of said set.

9. The combination defined in claim 1 wherein said rate of discharge controlling means comprises a variable resistance and a device controlled by said simulated brake and operative in progressive depressed positions of said brake to connect progressively decreasing resistance value portions of said variable resistance in parallel with said capacitor to discharge said capacitor at varying rates and in the released position of said simulated brake to disconnect said capacitor from all of said variable resistance.

10. In an automobile simulator having a simulated accelerator, a simulated brake, a simulated transmission shifting device and a simulated speedometer in the form of a voltmeter, a capacitor connected in parallel with said voltmeter, a voltage source connected at one side to one side of said capacitor, a voltage divider connected across said voltage source, a first switching device controlled by said shifting device for selecting one of a series of voltages from said voltage divider, a potentiometer connected between the output of said first switching means and said one side of said voltage source and having a movable arm connected for movement with said simulated accelerator, a first set of resistors, a second switching means controlled by said simulated accelerator, said second switching means having an output terminal and being operative to establish a connection between its output terminal and said potentiometer movable arm only so long as said accelerator is depressed, a third switching means controlled by said shifting device and selectively operable therewith to connect one of said first set of resistors in series between said second switching means output terminal and the other side of said capacitor to thereby establish a charging circuit for said capacitor, a second set of resistors, and a fourth switching means controlled by said shifting means for selective connection of one of the resistors of said second set in series between said second switching device and said capacitor one side when said simulated accelerator is not depressed to establish a first discharge path for said capacitor through one of said second set of resistors, a third set of resistors, and a fifth switching means controlled by said simulated brake for connecting a selected one of said third set of resistors in parallel with said capacitor to establish a further discharge path therefor.

11. A vehicle velocity indicator simulator comprising a vehicle inertia simulating a capacitor, a voltmeter connected in parallel with said capacitor, said voltmeter having an indicator movable to positions indicative of the voltage imposed on said voltmeter and a cooperating scale calibrated in velocity increments, a voltage source, a selectively movable simulated accelerator control, means for applying to said capacitor from said voltage source a voltage proportional to the magnitude of movement of said accelerator control from a limit position thereof and means operative while said accelerator control is at said limit position for disconnecting said capacitor from said source and establishing a discharge circuit for said capacitor.

12. An automobile simulator having operator manipulatable instrumentalities, a voltmeter calibrated to simulate speed indications, a capacitor connected in parallel with said voltmeter to control the indication of said voltmeter, a variable frequency audio oscillator, a sound generator connected to the output of said oscillator, means controlled by said operator manipulatable instrumentalities of said simulator for conjointly controlling the frequency of said oscillator and the magnitude of and rate of variation of the magnitude of the charge upon said capacitor to thereby audibly and visually simulate variations in the speed of the automobile simulator.

13. In an automobile simulator having operator manipulatable instrumentalities, a voltmeter calibrated to simulate speed indications, a vehicle inertia simulating capacitor connected in parallel with said voltmeter to control the indication of said voltmeter, and means controlled by the operator manipulatable instrumentalities of said simulator for controlling the magnitude of and the rate of variation of the charge upon said capacitor, one of said operator manipulatable instrumentalities being a simulated brake and said last-named means including circuit means operative during decrease of the magnitude of the charge upon said capacitor, said decrease being engendered by actuation of said simulated brake and said circuit being effective upon decrease of the magnitude of the charge upon said capacitor to a predetermined voltage magnitude to thereafter automatically accelerate the rate of the decrease of the magnitude of the charge upon said capacitor.

References Cited in the file of this patent

UNITED STATES PATENTS

| | | |
|---|---|---|
| 2,273,091 | De Silva | Feb. 17, 1942 |
| 2,630,171 | Allgaier | Mar. 3, 1953 |
| 2,715,783 | Chedister et al. | Aug. 23, 1955 |
| 2,742,714 | Allgaier | Apr. 24, 1956 |
| 2,743,417 | Hollmann | Apr. 24, 1956 |
| 2,870,548 | Chedister | Jan. 27, 1959 |
| 2,979,831 | Bullock | Apr. 18, 1961 |